(12) United States Patent
Wheeler et al.

(10) Patent No.: US 6,678,514 B2
(45) Date of Patent: Jan. 13, 2004

(54) MOBILE PERSONAL SECURITY MONITORING SERVICE

(75) Inventors: Jill Christine Wheeler, Gilbert, AZ (US); Mary Maureen Madine, Tempe, AZ (US); Bernard Richard McKibben, Gilbert, AZ (US)

(73) Assignee: Motorola, Inc., Schaumburg, IL (US)

( * ) Notice: Subject to any disclaimer, the term of this patent is extended or adjusted under 35 U.S.C. 154(b) by 191 days.

(21) Appl. No.: 09/736,489

(22) Filed: Dec. 13, 2000

(65) Prior Publication Data

US 2002/0072348 A1 Jun. 13, 2002

(51) Int. Cl.[7] .......................... H04M 11/04; H04B 1/06
(52) U.S. Cl. ................ 455/404.1; 455/345; 455/404.2; 455/456.1; 340/539.12; 340/539.13
(58) Field of Search ...................... 455/404.1, 404.2, 455/456.1, 445, 556.1, 557, 344, 345; 340/500, 539.1, 539.11, 539.12, 539.13

(56) References Cited

U.S. PATENT DOCUMENTS

| 5,479,482 | A | | 12/1995 | Grimes |
| 6,061,561 | A | | 5/2000 | Alanara et al. |
| 6,073,004 | A | | 6/2000 | Balachandran |
| 6,075,983 | A | * | 6/2000 | Kumagai ..................... 455/410 |
| 6,167,255 | A | * | 12/2000 | Kennedy, III et al. ...... 455/404 |
| 6,349,201 | B1 | * | 2/2002 | Ford ........................ 455/404.1 |
| 6,405,033 | B1 | * | 6/2002 | Kennedy, III et al. ... 455/404.1 |

FOREIGN PATENT DOCUMENTS

| EP | 0789498 A2 | 8/1997 |
| WO | WO 97/23104 | 6/1997 |

* cited by examiner

*Primary Examiner*—Quochien B. Vuong
(74) *Attorney, Agent, or Firm*—Frank J. Bogacz

(57) ABSTRACT

A method for requesting and dispatching emergency services to a wireless communications network customer (102) is provided. When a request for emergency services is transmitted by a customer (102), the request is sent to a monitoring center (108), whereupon the monitoring center (108) evaluates the location of the customer (102), the personal profile of the customer (102), and the nature of the request. The monitoring center (108) then issues an appropriate dispatch to a pool of emergency services providers (110).

8 Claims, 1 Drawing Sheet

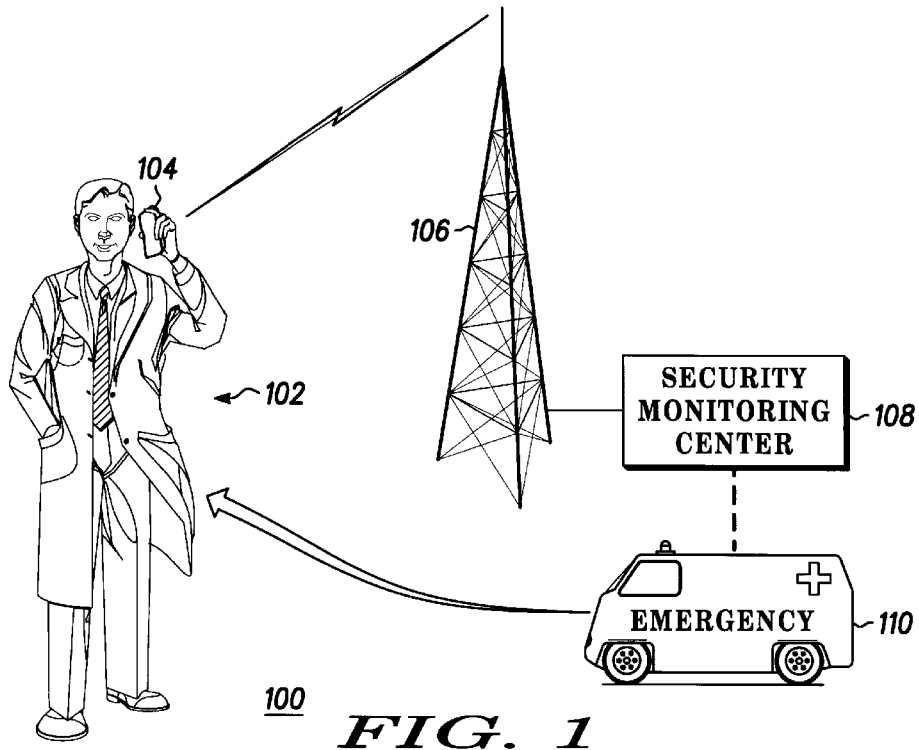
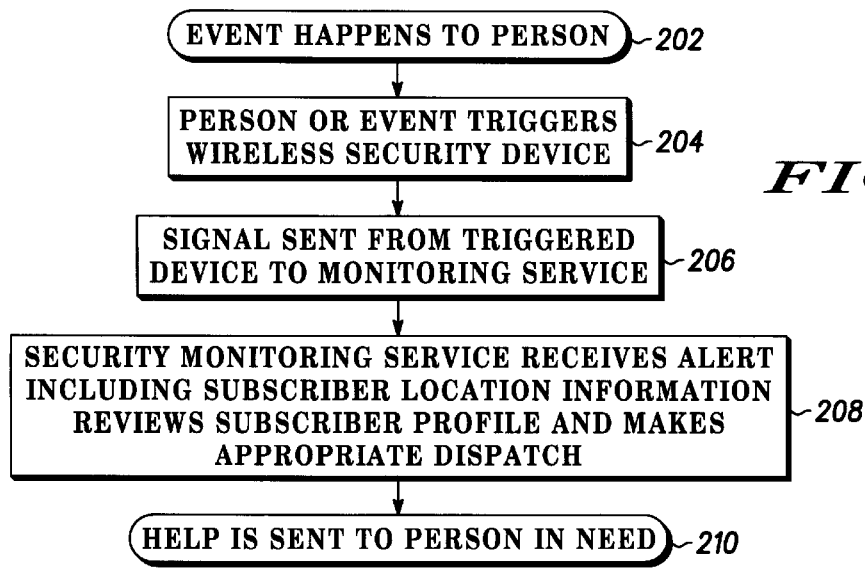

MOBILE PERSONAL SECURITY MONITORING SERVICE

TECHNICAL FIELD

The present invention relates, generally, to the use of portable wireless communication devices for transmitting a request for emergency services and, more particularly, to a method for transmitting, along with the request for emergency assistance, the geographical location and a personal profile of the requester.

BACKGROUND ART AND TECHNICAL PROBLEMS

Presently known methodologies for requesting emergency services include, for example, roadside assistance provided by auto clubs, "911" emergency services by local municipalities, and the like. Although these providers are generally fairly adept at dispatching appropriate services when requested, they typically require the requester to orally describe the precise geographic location (e.g., street address) at which the services are needed, and may also require an oral description of a person's medical condition, history, and other information. This can be cumbersome in some circumstances and not possible in extreme situations. A technique for rendering emergency services is thus needed which automatically transmits geographic information and personal profile data along with the request for emergency services.

BRIEF DESCRIPTION OF THE DRAWINGS

The subject invention will hereinafter be described in conjunction with the appended drawing figures, wherein the referenced numerals in the drawing figures correspond to the associated descriptions provided below, and the drawing figures are as follows:

FIG. 1 is a schematic block diagram of a system for rendering emergency services in accordance with a preferred embodiment of the present invention; and FIG. 2 is a flowchart illustrating exemplary steps involved in requesting and dispatching emergency services in accordance with a preferred embodiment of the present invention.

DETAILED DESCRIPTION OF THE DRAWINGS

Personal wireless communication devices such as cellular telephones, global positioning systems (GPS), medical alert devices, pagers, two-way communication devices, and the like are continuing to proliferate across all geographic and socioeconomic boundaries. It is anticipated that at least some wireless service providers will be required to monitor the geographic location of some classes of devices, for example, cellular telephones. Techniques to be employed by the service providers for monitoring the physical location of devices requesting wireless network access may include the use of integral GPS capability, triangulation or other coordination of cellular bay stations, or other techniques for transmitting to the service provider information regarding the physical location of the communications device.

In accordance with one aspect of the present invention, the physical geographic location of a person requesting emergency services may be derived immediately and automatically from the data packet which includes the request for emergency services, thereby eliminating the need for the requester to orally communicate this information to the services provider.

In accordance with a further aspect of the present invention, a customized or personal profile of wireless customers may be maintained, for example, in a database resident in the personal device, a central computer associated with the service provider, or both. In this way, personal profile information such as medical history, medical contacts, allergies, primary and secondary languages, religious affiliation, organ donor status, personal contact information, insurance or medical plan information, or other important personal information may be instantly available to the service provider without having to solicit this information from the requestor under emergency conditions.

FIG. 1 illustrates an exemplary emergency services provider system 100, including a customer 102 carrying a wireless communication device 104; a wireless communications network, including a wireless transceiver tower 106; a security monitoring center 108; and a pool of emergency services 110.

Wireless communication device 104 may include any one or more of a number of features for triggering a request for emergency services, depending on the type of situations under which a customer desires to trigger a request. For example, a trigger may include a panic button on the device, a particular keying sequence (i.e., manually pressing predetermined keys on a key pad in a specific order), a strong impact sensor (for example, for use in automatically transmitting a request in the event of a high-impact collision), a heat sensor (for example, for use in automatically requesting emergency services in the event of a fire), a medical sensor (e.g., for automatically triggering a request for emergency services upon the detection of the cessation of a heart beat or other physical or medical condition). In addition, wireless communication device 104 may be configured to transmit a request for emergency services by a predetermined voice activation sequence.

Tower 106, typically associated with the wireless communication service provider, receives the request for emergency services and routes the request to an appropriate security monitoring center 108. In this regard, security monitoring center 108 may be the wireless communication service provider; alternatively, security monitoring center 108 may be a separate entity specializing in dispatching emergency services. In any event, upon receiving a request for emergency services, security monitoring center 108 may immediately and automatically determine the physical location of the requestor as well as the requestor's personal profile and dispatch appropriate personnel from emergency services pool 110, as necessary in view of the nature of the emergency, the location of the requester, and the personal profile of the requester.

FIG. 2 illustrates a process flow 200 for requesting and dispatching emergency services, beginning with an emergency event (step 202). Upon the occurrence of the emergency event, either a person or the event itself triggers a request for emergency services (step 204). For example, if customer 102 is being assaulted, he or she may press a panic button on wireless communication device 104, which causes a request for emergency services to be transmitted. Alternatively, in the event of a fire, high-temperature, high-impact collision, or other event or physical parameter, which is automatically detected, the security device may automatically transmit a request for emergency services without direct human intervention.

The request for emergency services is received by the emergency monitoring service (step 206), whereupon the security monitoring service evaluates the location of the requester, the personal profile of the subscriber, and the nature of the request, and makes an appropriate dispatch (step 208). In this regard, a single wireless communication device 104 may include multiple personal profiles, if desired. For example, each member of a family may have a separate and unique request code corresponding to a unique personal profile. In the context of a family, a first family member may transmit "*01" and the first family member's name and profile would be transmitted along with the request for emergency services. A second family member may enter "*02", whereupon the second family member's unique personal profile would be transmitted and so on. Moreover, personal profiles may be maintained for non-humans as desired. For example, the name, medical history and other appropriate information may be maintained for an animal, a car, or a commercial or industrial facility. In each case, relevant parameters relating to emergency circumstances could be included in each "personal profile."

After evaluating the information included with the request for emergency services, security monitoring center 108 dispatches appropriate personnel or services to the requester (step 210).

Although the present invention has been described with reference to the drawing figures, those skilled in the art will appreciate that the scope of the invention is not limited to the specific forms shown in the figures. Various modifications, substitutions, and enhancements may be made to the descriptions set forth herein, without departing from the spirit and scope of the invention which is set forth in the appended claims.

What is claimed is:

1. A method for requesting emergency services in a wireless communication network for a plurality of customers using a common wireless communication device, the method comprising the steps of:

maintaining a unique personal profile for each of said plurality of customers in a database permanently resident in said common wireless communications device, wherein each unique personal profile comprises at least one of medical and/or contact information about one of said plurality of customers;

receiving a trigger from one of the plurality of customers;

evaluating the trigger to identify said one of said plurality of customers;

determining a geographic location of said one of said plurality of customers; and transmitting an electronic request for emergency services from said wireless communication device to said wireless communication network in response to said trigger, wherein the electronic request includes the geographic location of said customer and said unique personal profile associated with said identified one of said plurality of customers.

2. The method of claim 1 wherein each of said unique personal profiles comprises a separate and unique request code.

3. The method of claim 1 wherein said trigger corresponds to at least one keypress from a keypad associated with said wireless communications device.

4. The method of claim 1 wherein said receiving step comprises automatically detecting a physical parameter.

5. The method of claim 4 wherein the physical parameter comprises a high-impact collision.

6. The method of claim 4 wherein the physical parameter comprises a high-temperature condition.

7. The method of claim 4 wherein the physical parameter comprises a heart beat of said one of said plurality of customers.

8. The method of claim 1 wherein said trigger corresponds to a voice command.

\* \* \* \* \*